(No Model.)
C. A. NORLIN.
BELT TIGHTENER.
No. 455,799. Patented July 14, 1891.
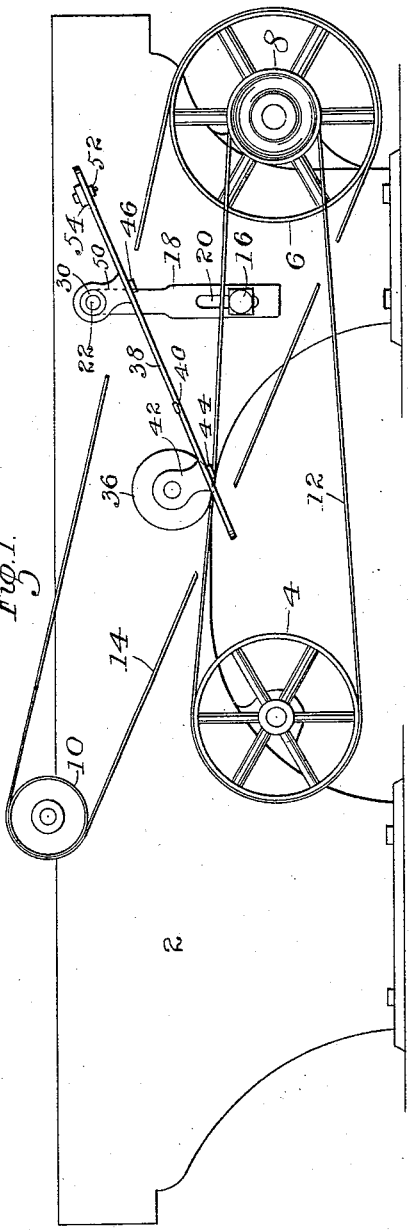
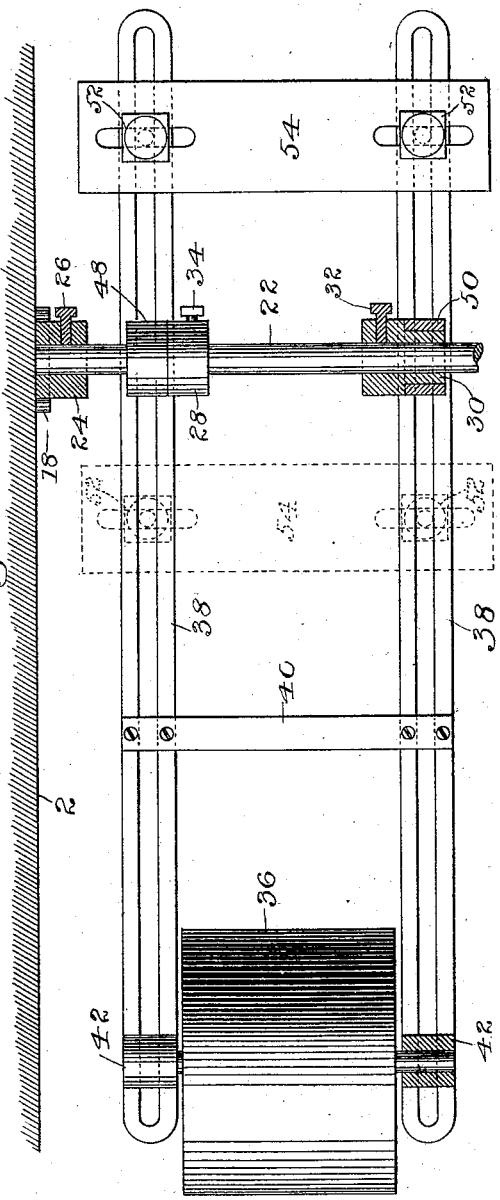
Witnesses:—
C. L. Caldwell.
A. MacWelch
Inventor:—
Charles A. Norlin,
per Paul T. Munro
Attorneys.

UNITED STATES PATENT OFFICE.

CHARLES A. NORLIN, OF SOUTH STILLWATER, MINNESOTA.

BELT-TIGHTENER.

SPECIFICATION forming part of Letters Patent No. 455,799, dated July 14, 1891.

Application filed January 19, 1891. Serial No. 378,205. (No model.)

*To all whom it may concern:*

Be it known that I, CHARLES A. NORLIN, of South Stillwater, Washington county, Minnesota, have invented certain Improvements in Belt-Tighteners, of which the following is a specification.

My invention relates to improvements in the swinging or pivoted supports for loose or idler drums adapted to bear upon machinery belts to give them requisite tension; and it consists in the construction and combination hereinafter described, and particularly pointed out in the claims.

In the accompanying drawings, forming part of this specification, Figure 1 is a side elevation of the machine-frame or bed fitted with pulleys and belting, showing my improved belt-tightener secured to the frame and bearing upon one of the belts; and Fig. 2 is a detail plan view and partial section of the belt-tightener.

In the drawings, 2 represents a machine-frame or bed, such as that of a planing-machine, having the pulleys or belt-drums 4, 6, 8, and 10 and the connecting-belts 12 and 14. Secured to the side of the frame or bed by means of a screw or bolt 16 is the standard or tightener-support 18, having the slot 20, through which the bolt 16 is passed and secured to the frame, the standard thus being angularly and vertically adjustable upon the frame 2 by slipping up or down or turning it on the bolt as a pivot, and then the bolt tightened. The standard is provided with the spindle 22, extending at right angles to it, either formed integrally with it or secured in an opening in the enlarged upper end or head 24 by means of a set-screw 26. Adjustable upon this spindle are the journal-sleeves 28 and 30, their opposite or outer ends being reduced, so that each sleeve is formed of two cylinders of different diameters. The sleeves are secured along the spindle in adjusted positions by means of set-screws 32 and 34. The idler 36 is supported by means of a frame made up of the slotted side bars 38, rigidly connected by means of a cross-bar 40. The bearings 42 of the idler-drum are secured in adjusted positions along the slots in the side bars by means of bolts 44 passing through the slots. Similarly secured by means of the bolts 46 are the bearings 48 and 50, into which are fitted the reduced ends of the sleeves 28 and 30, the shoulders of the sleeves abutting against the bearing-blocks. The bearings 48 and 50 thus form a hinge on which the frame swings, the distance between the idler and spindle being adjusted by shifting the bearings along the slotted side bars and securing them by means of their bolts. On the opposite end of the frame is secured by means of bolts 52, passing through the slots of the side bars, a counterbalance-weight 54, which is adjustable along the frame to and from the spindle 22, so as to determine the pressure of the idler 36 upon the belt, and thus secure any desired tension of the belt. It will thus be seen that the frame may be adjusted in its position along the spindle 22 as well as also adjusted back and forth on the bearings 48 and 50, and the relative position of the side bars varied, the position of the idler-pulley and counterbalance-weight shifted along the side bars and the bearings 48 and 50 adjusted at will, according to the position and size of belt and the tension required. The angular position of the frame with reference to the spindle 22 and the idler 36 may also be slightly varied by the adjustment of the set-screws and bolts, so as to cause the idler to bear properly upon the belt. In fact the position of the whole apparatus and its various parts may be adjusted in whatever way may be necessary to secure proper action of the tightener upon the belt. The frame may also be fitted with any desired size of idler by simply connecting the side bars by a cross-bar of proper length. The apparatus may thus be adapted to any size of belt in any position upon which the idler can bear of its own weight. The weight 54 may also be arranged to increase the pressure of the pulley upon the belt by securing it upon the same side of the spindle, as shown by dotted lines in Fig. 2.

I claim—

1. In a device of the class described, the combination of a standard vertically and angularly adjustable upon a suitable support, a horizontal spindle carried by said standard, a frame hinged upon said spindle and adjustable along the same, an idler carried upon one end of said frame, and a counterbalance-weight adjustable along said frame, substantially as and for the purposes set forth.

2. The combination, with a suitable support, of a standard secured thereto and adjustable thereon in a vertical plane, a horizontal spindle carried by said standard, journal-sleeves adjustable upon said spindle, and an idler-carrying frame having adjustable bearings to receive said sleeves, substantially as described.

3. The combination, with a suitable support, of a standard secured thereto and adjustable thereon in a vertical plane, a spindle carried by said standard, journal-sleeves adjustably secured upon said spindle, a pulley-carrying frame having longitudinally-slotted side bars, and bearings for said sleeves adjustably secured along said side bars, substantially as and for the purposes set forth.

4. In a device of the class described, the combination, with a pulley-carrying frame, of a horizontal spindle vertically and laterally adjustable upon a suitable support, journal-sleeves adjustable along said spindle, and bearings for said sleeves adjustable along said frame, substantially as and for the purposes set forth.

5. In a device of the class described, the combination, with a suitable support, of a horizontal spindle vertically and laterally adjustable on said support, journal-sleeves adjustable along said spindle, bearings for said sleeves, a frame adjustably secured to said bearings, and an idler-pulley and counterbalance-weight adjustable along said frame, substantially as and for the purposes set forth.

6. The combination, with a suitable support, of a standard 18, vertically and angularly adjustable upon said support, the spindle 22, carried by said standard, the journal-sleeves 28 and 30, adjustable along said spindle, the slotted bars 38, having the bearings 48 and 50, adjustable along the same and adapted to receive the sleeves 28 and 30, and the idler-pulley 36 and counterbalance-weight 54, adjustable along said bars, substantially as and for the purposes set forth.

In testimony whereof I have hereunto set my hand, this 8th day of January, 1891.

CHARLES A. NORLIN.

In presence of—
F. V. COMFORT,
JNO. P. GRULIUS.